US010929445B2

(12) United States Patent
Zhang et al.

(10) Patent No.: US 10,929,445 B2
(45) Date of Patent: Feb. 23, 2021

(54) DISTRIBUTED SEARCH FRAMEWORK WITH VIRTUAL INDEXING

(71) Applicant: EMC IP Holding Company LLC, Hopkinton, MA (US)

(72) Inventors: Steven Y. Zhang, Shanghai (CN); Cherami Liu, Shanghai (CN); Lihui Su, Shanghai (CN); Frank Huang, Shanghai (CN); Jing Yu, Shanghai (CN); Jerry Jourdain, Hudson, NH (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 207 days.

(21) Appl. No.: 16/159,462

(22) Filed: Oct. 12, 2018

(65) Prior Publication Data
US 2020/0042641 A1    Feb. 6, 2020

(30) Foreign Application Priority Data
Aug. 3, 2018 (CN) .......................... 201810879338.7

(51) Int. Cl.
| G06F 7/00 | (2006.01) |
| G06F 16/31 | (2019.01) |
| G06F 17/11 | (2006.01) |
| G06F 16/13 | (2019.01) |
| G06F 16/93 | (2019.01) |

(52) U.S. Cl.
CPC ............ *G06F 16/328* (2019.01); *G06F 16/13* (2019.01); *G06F 16/93* (2019.01); *G06F 17/11* (2013.01)

(58) Field of Classification Search
CPC ........ G06F 16/328; G06F 16/93; G06F 16/13; G06F 17/11
USPC ................................................. 707/600–899
See application file for complete search history.

(56) References Cited

U.S. PATENT DOCUMENTS

2012/0159114 A1* 6/2012 Egger ................. G06F 9/30098
711/203

* cited by examiner

*Primary Examiner* — Issac M Woo
(74) *Attorney, Agent, or Firm* — Womble Bond Dickinson (US) LLP (57) ABSTRACT

A distributed search framework with virtual indexing is disclosed. According to some embodiments, a virtual index that includes a first physical index is created, where the first physical index includes a first number of shards. A request to index a document is received. In response to the request, whether the first physical index has reached a capacity threshold is determined. In response to determining that the first physical index has reached the capacity threshold, a second physical index is automatically created and added to the virtual index, where the second physical index includes a second number of shards. The document is added into the second physical index.

21 Claims, 7 Drawing Sheets

| | Conventional approach | New approach k=2 | New approach k=3 | New approach k=4 | New approach k=5 |
|---|---|---|---|---|---|
| m=1 | 10,000 | 14 (10.23%) | 10 (3.64%) | 8 (0.85%) | 7 (0.31%) |
| m=3 | 3,334 | 12 (7.65%) | 9 (3.63%) | 7 (0.63%) | 6 (0.18%) |
| m=5 | 2,000 | 11 (6.35%) | 8 (2%) | 7 (1.05%) | 6 (0.3%) |
| m=7 | 1,429 | 11 (6.35%) | 8 (2.8%) | 7 (1.47%) | 6 (0.42%) |

DISTRIBUTED SEARCH FRAMEWORK WITH VIRTUAL INDEXING

FIELD OF THE INVENTION

Embodiments of the present invention relate generally to a distributed search framework. More particularly, embodiments of the invention relate to methods and systems for a distributed search framework with virtual indexing.

BACKGROUND

Today, there are many distributed search frameworks or components that provide data indexing and searching capability. For a better distribution, an index includes multiple shards (or partitions) that can be resided in different nodes. Generally, the number of shards in an index must be fixed when the index is generated, since documents in an index should be evenly distributed to its shards. This is mostly implemented by routing documents to each shard with a hash algorithm. If the number of shards changes, all of the documents in the index would need to be rehashed and moved among different shards.

A shard refers to a horizontal partition of data in a database or search engine. It includes one or more files that store indexed information of a group of documents. The shard size is a very important factor in a distributed search system. It should not be too small, or otherwise, a large number of shards are needed to store a certain volume of index data, which brings a heavy workload to maintain the shard status in each node. On the other hand, the shard size should not be too large. Otherwise, it is inefficient to move shards among nodes and is not optimized for query performance.

Figure 1:
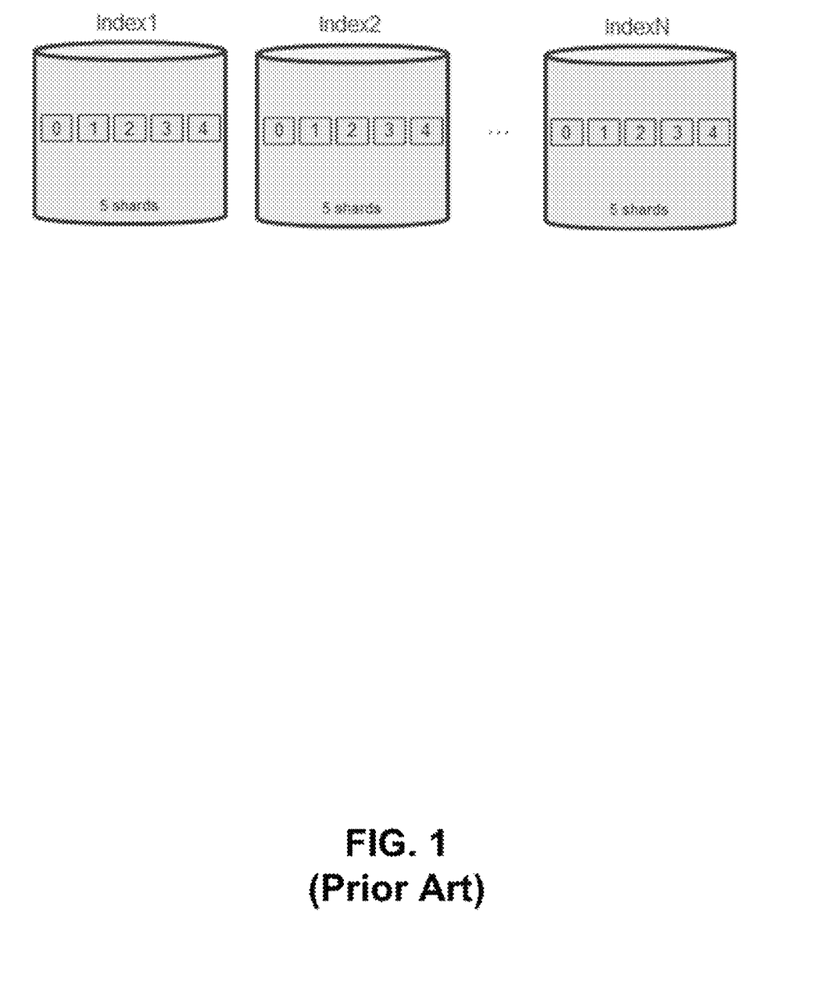
FIG. 1 is a diagram illustrating a conventional data indexing system.

Generally, there is a suggested value for shard size (e.g., approximately 40 GB) in an index system of a distributed search system (e.g., Elasticsearch). Given that an index will have a fixed number of shards and each shard has a size limit, an index will also have a capacity limit. To resolve this issue, the conventional approach is to create a new index when the previous index has reached its capacity limit. An example of the conventional approach is illustrated in FIG. 1. As shown, the indexing system of FIG. 1 has a number of indices (e.g., 1 ... N, where N is any positive integer). Each index includes, for example, five (5) shards (0 ... 4), with each shard being represented by a square. These shards can be distributed in different nodes.

However, there are several issues with the conventional indexing system. For example, with the conventional approach, a user would need to decide when to create a new index. Moreover, the user would need to decide the number of shards the new index should have. This is a difficult decision since the user may not have prior knowledge of the amount of the final volume of index data. In that regard, if the user selects a small shard number for each index, then there will be a significant number of small indices for a large volume of index data. This will adversely impact the index system performance since the system needs to maintain the status of a large number of indices in each node. In contrast, if the user selects a large shard number for each index, then there will be a significant number of small shards for a small volume of index data. This will also adversely impact the search system performance since the query result has to be merged from too many shards in different nodes, which can be avoided if the volume of index data can be predicted.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. Random access refers to access (read/write) to a random offset of a file at least once during a read/write input/output operation.

According to one embodiment, a virtual index that includes a first physical index is created, where the first physical index includes a first number of shards. A request to index a document is received. In response to the request, whether the first physical index has reached a capacity threshold is determined. In response to determining that the first physical index has reached the capacity threshold, a second physical index is automatically created and added to the virtual index, where the second physical index includes a second number of shards. The document is added into the second physical index.

In one embodiment, a compaction log is created. A smallest physical index and a current physical index included in the virtual index are determined. One or more documents are moved from the smallest physical index to the current physical index, where a record for each document move is added to the compaction log. Whether the move is successful is determined. In response to determining that the move is successful, the smallest physical index and the compaction log are removed from the virtual index. This embodiment may be repeated until a target number of physical indices are obtained.

In another embodiment, in response to determining that the move is unsuccessful, the current physical index is rolled back to a previous physical index based on the compaction log.

In yet another embodiment, the first number of shards and the second number of shards are computed in accordance with a shard number function. In one embodiment, the shard number function is: $s=m*k^{n-1}$, where s is a number of shards, m is an initial number of shards, k is an increasing factor, and n is a sequence number of a physical index.

In still another embodiment, the smallest physical index is the first physical index, and the current physical index is the second physical index.

Figure 2:
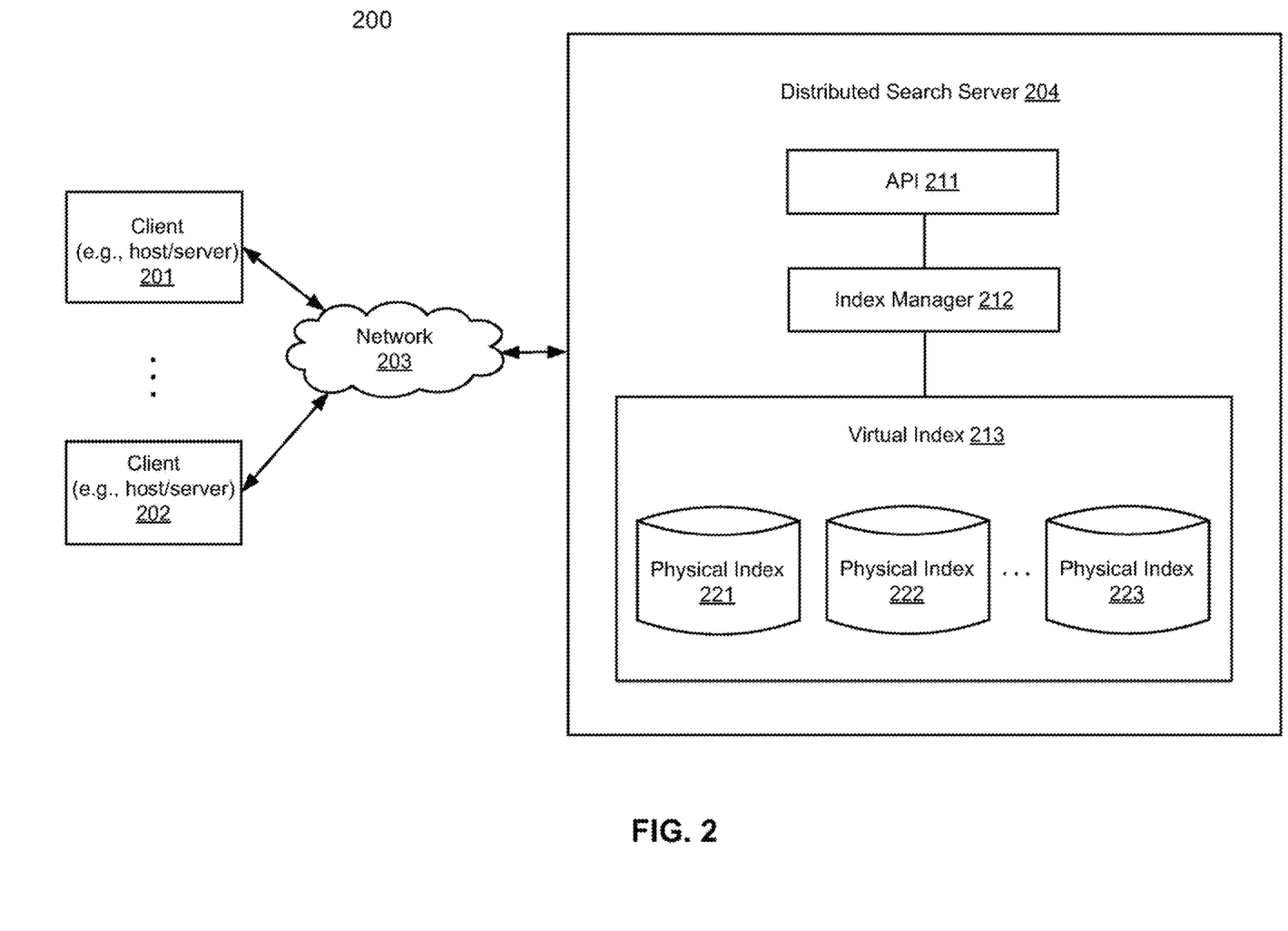
FIG. 2 is a block diagram illustrating an example of a distributed search system according to one embodiment.

FIG. 2 is a block diagram illustrating an example of a distributed search system according to one embodiment. Referring to FIG. 2, system 200 includes, but is not limited to, one or more client systems 201-202 communicatively coupled to a distributed search server 204 over network 203. Clients 201-202 may be any type of clients such as a host or server, a personal computer (e.g., desktops, laptops, and tablets), a "thin" client, a personal digital assistant (PDA), a Web enabled appliance, a mobile phone (e.g., Smartphone), or a wearable device (e.g., smartwatch), etc. Alternatively, any of clients 201-202 may be a primary storage system (e.g., local data center) that provides storage to other local clients, which may periodically back up the content stored therein to a backup storage system (e.g., a disaster recovery site or system). Network 203 may be any type of networks such as a local area network (LAN), a wide area network (WAN) such as the Internet, a fiber network, a storage network, a cellular network, or a combination thereof, wired or wireless. Clients 201-202 may be in physical proximity or may be physically remote from one another.

With continued reference to FIG. 2, distributed search server 204 may include an application programming interface (API) 211 and an index manager 212. Server 204 may include or represent any type of servers or a cluster of one or more servers. Server 204 may be referred to as a node that is part of a cluster. A cluster refers to as a collection of nodes that shares information. In one embodiment, server 204 may store data that any of clients 201-202 may query, and participate in cluster indexing and search capabilities. Server 204 may distribute shards within physical indices to different nodes (or servers) in a shared cluster. In one embodiment, server 204 may replicate its physical indices across other nodes, thereby generating replica shards, as a backup mechanism.

API 211 may be configured to receive an incoming request from any of clients 201-202 to perform one or more functions. For example, the request may include a request to create an index (e.g., virtual index 213 and/or any of physical indices 221-223), or a request to ingest documents. An index refers to as a collection of documents with similar or same characteristics. A document refers to as a basic unit of information that can be indexed, which may be represented as a row in a table. In one embodiment, the request may be a Hypertext Transfer Protocol (HTTP) request. In one embodiment, API 211 may be a representational state transfer (REST) API.

After processing the request, API 211 may invoke index manager 212 to perform one or more functions (e.g., an indexing or a searching function) based on the request. In one embodiment, index manager 212 may create virtual index 213 that includes a number of physical indices 221-223. That is, virtual index 213 may be a group of one or more physical indices, such as physical indices 221-223. Each of physical indices 221-223 may have a different or same number of shards.

In one embodiment, index manager 212 may automatically expand the capacity of virtual index 213 in accordance with a shard number function. In doing so, index manager 212 may determine whether a current physical index (e.g., physical index 221) has reached a capacity threshold or limit. If so, index manager 212 may expand the capacity of virtual index 213 by creating and adding another physical index (e.g., physical index 222) to virtual index 213. In one embodiment, the number of shards in the newly created physical index (e.g., physical index 222) may be larger than the number of shards in the previous physical index (e.g., physical index 221 based on an increasing factor. When the second physical index (e.g., physical index 222) has reached its capacity limit, index manager 212 may again create and add yet another physical index (e.g., physical index 223) to virtual index 213, and so on, thereby creating a non-linear expansion of virtual index 213.

In one embodiment, index manager 212 may compact the capacity of virtual index 213. With increasing indices generated in virtual index 213, index manager 212 may optimize virtual index 213 by compacting its data on the physical index level. The compaction is a process that moves documents from a smallest physical index to a largest physical index. The expansion and compaction of the capacity of a virtual index are discussed in more detail herein below.

Figure 3A:
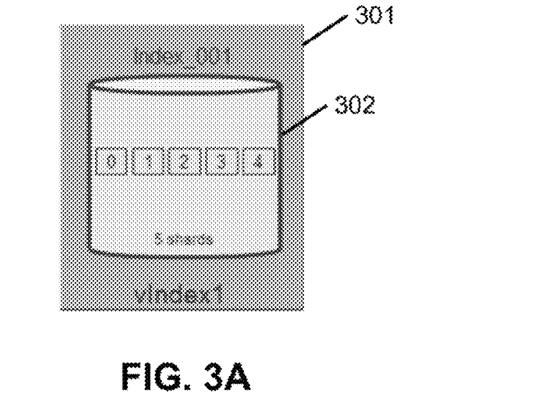
FIGS. 3A-3C is a block diagram illustrating an example of a virtual index expansion system according to one embodiment.
Figure 3B:
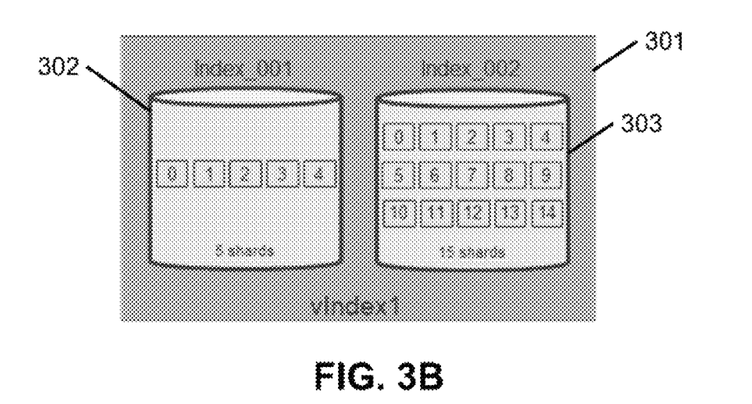
Figure 3C:
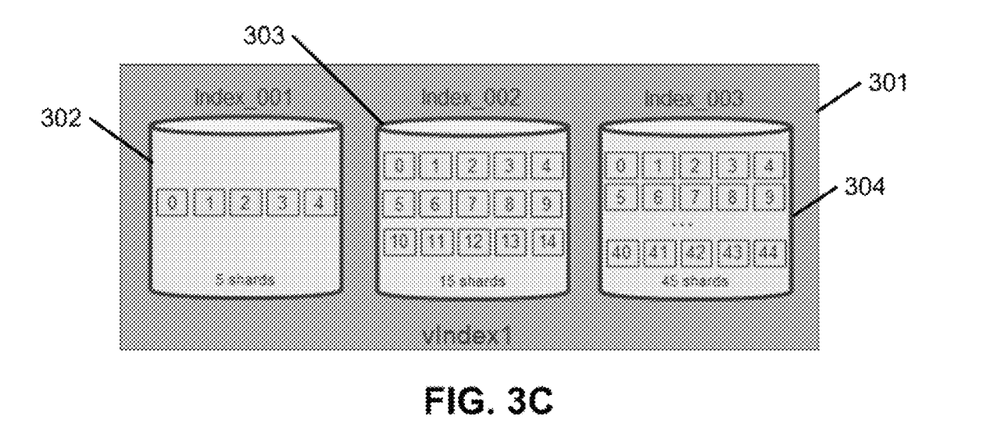

FIGS. 3A-3C is a block diagram illustrating an example of a virtual index expansion system according to one embodiment. Referring to FIG. 3A, when a virtual index 301 (also referred to as vIndex1) is created, for example by index manager 212, a physical index 302 (referred to as Index_001) is also created and added into virtual index 301. In one embodiment, virtual index 301 may be virtual index 213 of FIG. 2 as previously described. In one embodiment, virtual index 301 and physical index 302 may be created based on a shard number function defined as follows:

shard number $s=m*k^{n-1}$, where m is the initial number of shards (or shard number) for a first physical index (e.g., physical index 302), k is the increasing factor, and n is a sequence number of the physical index (which begins from 1 for the first physical index).

Accordingly, in the example of FIG. 3A, assume m=5 and k=3, the shard number of physical index 302 is 5 shards (e.g., labelled 0-4 in FIG. 3A). Referring now to FIG. 3B, when first physical index 302 has reached its capacity threshold or limit (which may be determined based on the shard number and shard size of each shard), another physical index 303 (Index_002) is created and added into virtual index 301, thereby expanding the capacity of virtual index 301. Based on the shard number function as previously described, the shard number of physical index 303 is $5*3^1=15$ shards (labelled as 0-14). Similarly, referring now to FIG. 3C, when physical index 303 has reached its capacity limit, an additional physical index 304 (Index_003) is created and added to virtual index 301. Again, using the shard number function, the shard number of physical index 304 is $5*3^2=45$ shards (labelled as 0-44). In this way, a user is not required to determine the shard number a physical index will need or when to create a physical index. The user instead interacts with a virtual index (e.g., determine the initial shard number m and increasing factor k), and the capacity of the virtual index (e.g., virtual index 301) can be automatically expanded. New data (or documents) are stored in the current (or latest) physical index. A query request may be executed in every physical index (e.g., physical indices 302-304) and the query result from each physical index may be merged. In one embodiment, an update or delete query may initially query the physical index where a document is located in. Subsequently, the update/delete operation may be performed on the target physical index.

Figure 4A:
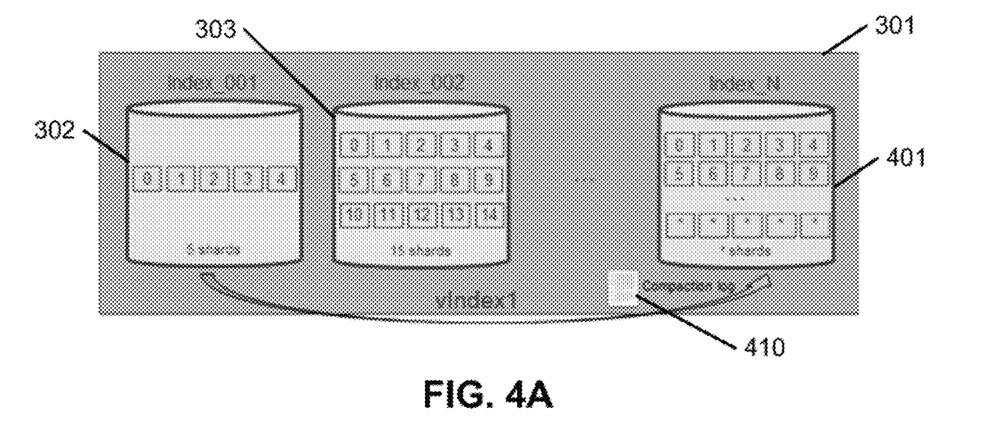
FIGS. 4A-4B is a block diagram illustrating an example of a virtual index compaction system according to one embodiment.
Figure 4B:
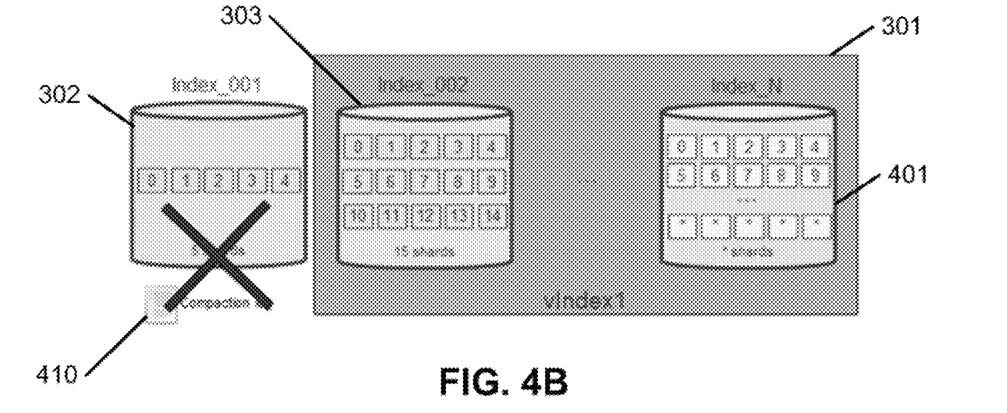

FIGS. 4A-4B is a block diagram illustrating an example of a virtual index compaction system according to one embodiment. Referring to FIG. 4A, with an increasing number of physical indices generated in virtual index 301 (e.g., Index_001 . . . Index_N), virtual index 301 may be optimized by compacting its data on a physical index level. Compaction refers to a process that moves documents from a smallest physical index (e.g., the least number of shards) to a largest physical index (e.g., the most number of shards). For example, referring now to FIGS. 4A-4B, documents in physical index 302 (smallest physical index) may be moved to current or latest physical index 401 (Index_N), which may be the largest physical index. In one embodiment, each document move may be recorded in a compaction log 410 to support rollback in a case of failure. After all documents from physical index 302 have been successfully moved, physical index 302 (and compaction log 410 in one embodiment) may be removed from virtual index 301.

As an example, if a final set of data requires T shards and the initial shard number is m, using the conventional indexing approach, n=⌈T/m⌉ indices are needed to hold those data. However, with the embodiments of the present disclosure, a user may invoke a non-linear increase in the number of shards to ensure that:

$$m+m*k+m*k^2+m*k^3+m*k^4+ \ldots +m*k^{n-1}>=T.$$

In this way, the required number of physical indices is: n=⌈$\log_k(1+T*(k-1)/m)$⌉, with k being the increasing factor.

For example, assume the final set of data needs 10,000 shards, and the initial shard number is 5. With the conventional indexing approach, ⌈10,000/5⌉=2,000 physical indices are needed. With the embodiments of the present disclosure, if a user sets k=3, then the required number of physical indices is: ⌈$\log_3(1+10000*(3-1)/5)$⌉=8 physical indices. This therefore significantly reduces the total number of physical indices.

Furthermore, the number of physical indices may be reduced to 4 by compaction (as previously discussed with respect to FIGS. 4A-4B). This compaction needs to move the documents in the smallest four physical indices to the largest physical index. The ratio of the documents needs to move is $(5+5*3+5*3^2+5*3^3)/10000=2\%$, which is a very small portion of the entire set of documents.

Figure 4C:
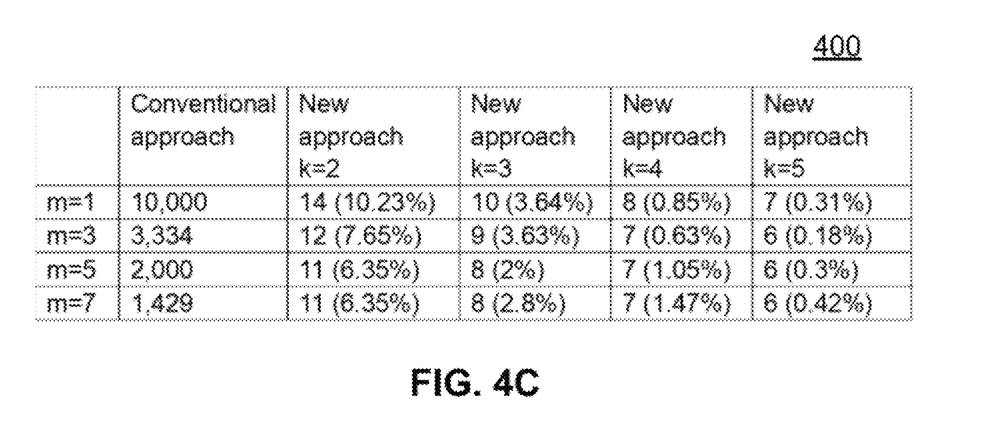
FIG. 4C is a table comparing a conventional indexing system with the system in accordance with embodiments of the disclosure.

FIG. 4C is a table comparing a conventional indexing system with the system in accordance with embodiments of the disclosure. Referring to FIG. 4C, table 400 shows performance results with different values form and k. For instance, in the first row of table 400, 10,000 shards are selected with the conventional approach as compared to the embodiments of the present disclosure. The percentage of data needed to move in order to maintain the number physical indices <=4 is also listed after the physical index number. For example, referring to the first row which shows "14 (10.23%)", in this example "14" is the number of physical indices, and "10.23%" is the percentage of data needed to move to maintain the number of physical indices <=4.

From table 400, it can be seen that compared to the conventional approach, embodiments of the present disclosure require substantially less physical indices. The amount of data needed to move is also very small if a user wants to maintain a total number of physical indices less than or equal to 4. In addition, k (the increasing factor) may be a dynamic value based on a creation interval of new physical indices. With the virtual index and its expansion and compaction capability, an auto-scaling indexing system can be implemented. At the same time, a user can control the index number on demand. For example, the user can maintain a virtual index with 3 to 4 physical indices, where the virtual index can meet most requirements. Only a small portion of the entire set of data needed to be moved in order to achieve this goal.

Figure 5:
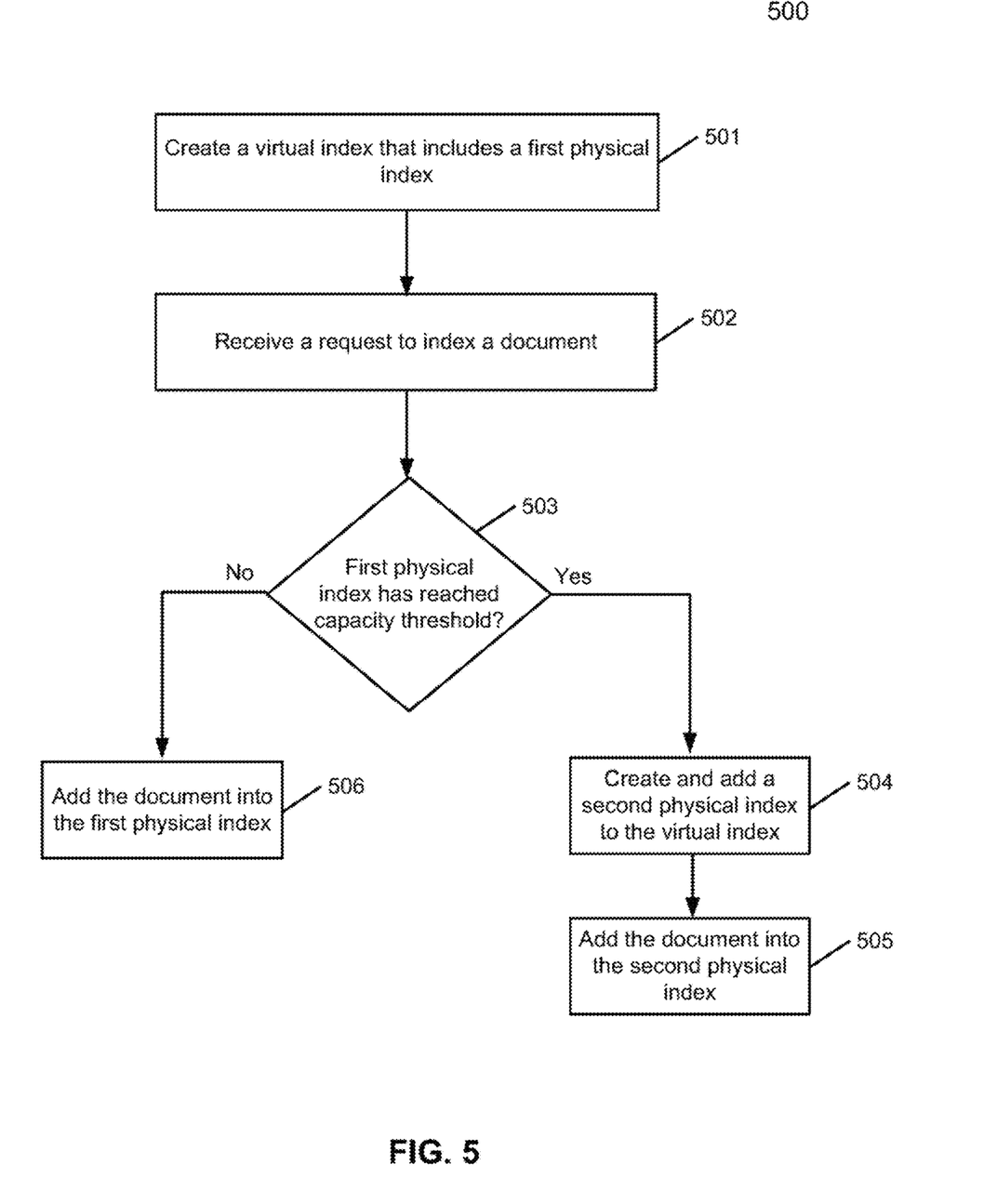
FIG. 5 is a flow diagram illustrating a method of data indexing according to one embodiment.

FIG. 5 is a flow diagram illustrating a method of data indexing according to one embodiment. Process 500 may be performed by processing logic that includes hardware (e.g. circuitry, dedicated logic, etc.), software (e.g., embodied on a non-transitory computer readable medium), or a combination thereof. For example, process 500 may be performed by index manager 212 of FIG. 2.

Referring to FIG. 5, at block 501, the processing logic creates a virtual index (e.g., virtual index 301 of FIG. 3) that includes a first physical index (e.g., physical index 302). At block 502, the processing logic receives a request, for example from any of clients 201-202, to index a document. At block 503, in response to the request, the processing logic determines whether the first physical index has reached a capacity threshold or limit. If so, the processing logic proceeds to block 504. Otherwise, the processing logic proceeds to block 506, where the processing logic adds the document into the first physical index. At block 504, the processing logic creates and adds a second physical index to the virtual index. At block 505, the processing logic adds the document into the second physical index.

Figure 6:
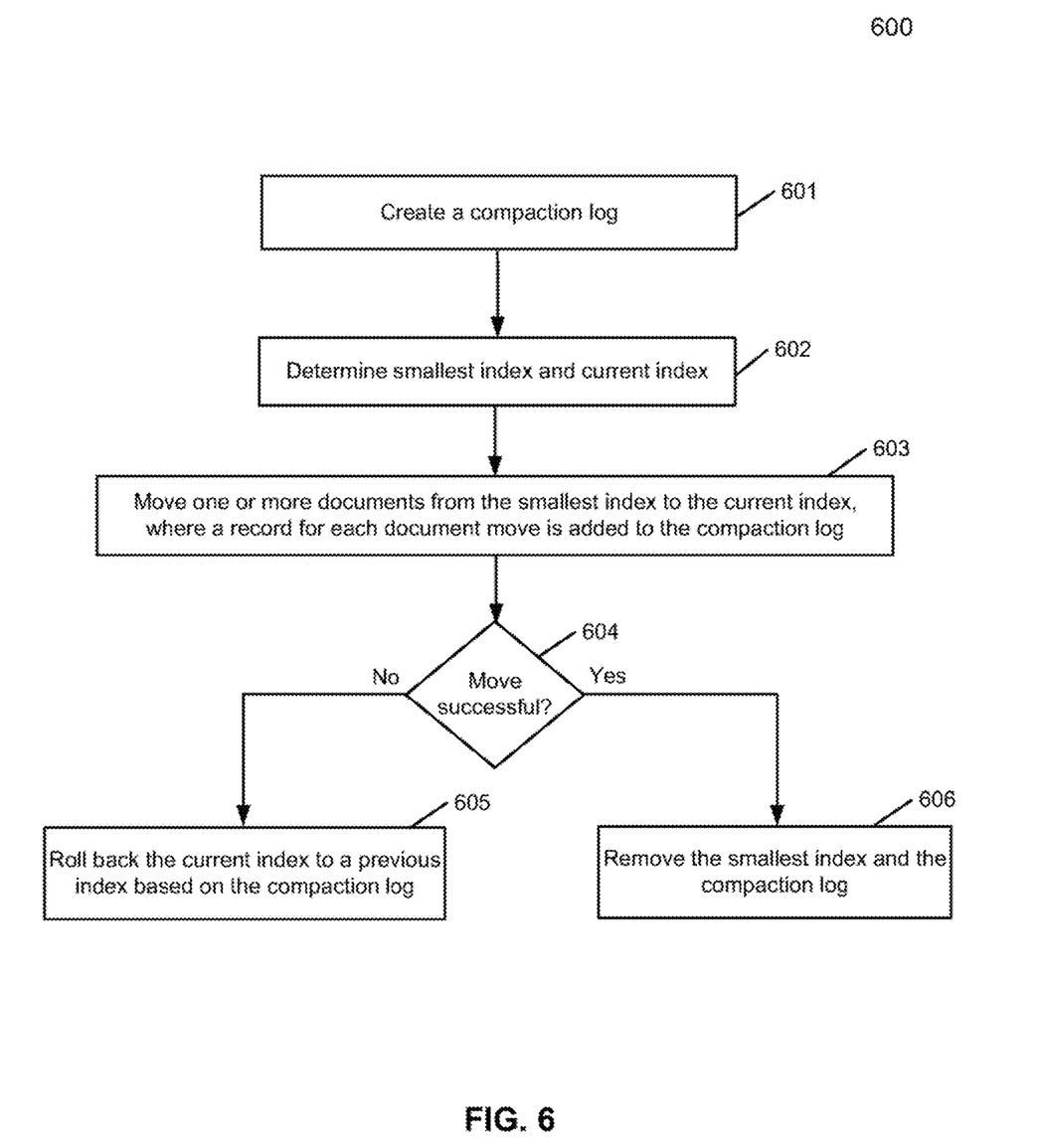
FIG. 6 is a flow diagram illustrating another method of data indexing according to one embodiment.

FIG. 6 is a flow diagram illustrating another method of data indexing according to one embodiment. Process 600 may be performed by processing logic that includes hardware (e.g. circuitry, dedicated logic, etc.), software (e.g., embodied on a non-transitory computer readable medium), or a combination thereof. For example, process 600 may be performed by index manager 212 of FIG. 2.

Referring to FIG. 6, at block 601, the processing logic creates a compaction log (e.g., compaction log 410). At block 602, the processing logic determines a smallest physical index (e.g., index 302) and a current (or largest) physical index (e.g., index 401). At block 603, the processing logic moves one or more documents from the smallest index to the current index, where a record for each document move is added to the compaction log. At block 604, the processing logic determines whether the move is successful. In one embodiment, the move is successful if all documents are moved to the current index, or alternatively, the move is successful if most of the documents are moved to the current index. If it is determined that the move is successful, the processing logic proceeds to block 606, where the processing logic removes (or deletes) the smallest index and the compaction log from a virtual index (e.g., index 301). Otherwise, the processing logic proceeds to block 605, where the processing logic rolls back the current index to a previous index (e.g., index 302) based on the compaction log. In one embodiment, blocks 601-606 may be repeated until a target number of physical indices are obtained.

Note that some or all of the components as shown and described above (e.g., index manager 212) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
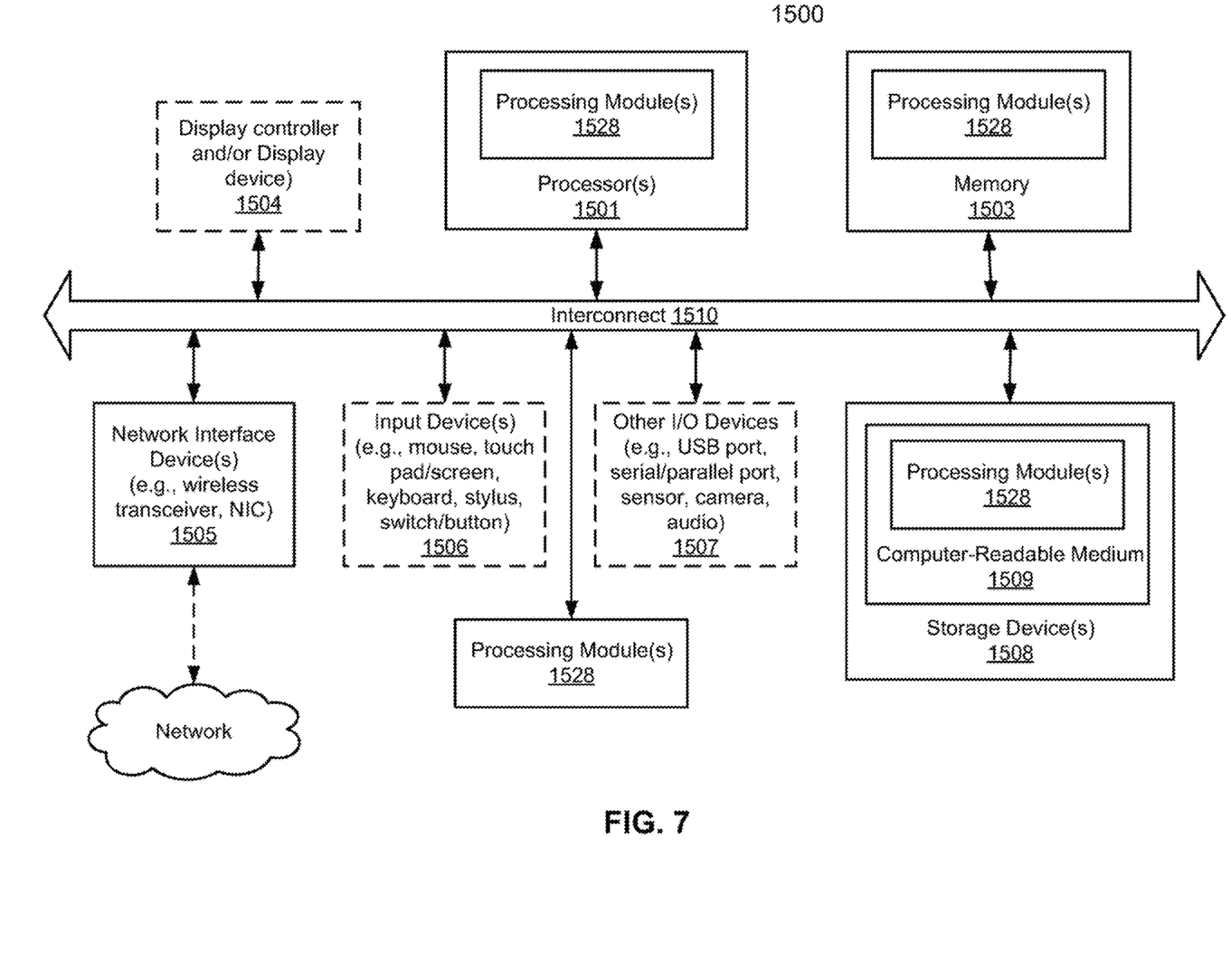
FIG. 7 is a block diagram illustrating a data processing system according to one embodiment.

FIG. 7 is a block diagram illustrating an example of a data processing system which may be used with one embodiment. For example, system 1500 may represents any of data processing systems described above performing any of the processes or methods described above. In one embodiment, system 1500 may be implemented as part of clients 201-202 or distributed search server 204. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method of data database indexing, comprising:

creating a virtual index and adding a first physical index to the virtual index, wherein the first physical index includes a first plurality of shards;

receiving a request to index a document;

in response to the request, determining whether the first physical index has reached a capacity threshold;

in response to determining that the first physical index has reached the capacity threshold, automatically creating and adding a second physical index to the virtual index, wherein the second physical index includes a second plurality of shards; and adding the document into the second physical index.

2. The method of claim 1, further comprising:

(i) creating a compaction log;

(ii) determining a smallest physical index and a current physical index included in the virtual index;

(iii) moving one or more documents from the smallest physical index to the current physical index, wherein a record for each document move is added to the compaction log;

(iv) determining whether the move is successful; and (v) in response to determining that the move is successful, removing the smallest physical index and the compaction log from the virtual index.

3. The method of claim 2, further comprising:

in response to determining that the move is unsuccessful, rolling back the current physical index to a previous physical index based on the compaction log.

4. The method of claim 2, further comprising:

repeating steps (i)-(v) until a target number of physical indices are obtained.

5. The method of claim 2, wherein the smallest physical index is the first physical index, and the current physical index is the second physical index.

6. The method of claim 1, wherein the first plurality of shards and the second plurality of shards are computed in accordance with a shard number function.

7. The method of claim 6, wherein the shard number function is: $s=m*k^{n-1}$, wherein s is a number of shards, m is an initial number of shards, k is an increasing factor, and n is a sequence number of a physical index.

8. A non-transitory machine-readable medium having instructions stored therein, which when executed by a processor, cause the processor to perform operations for database indexing, the operations comprising:

creating a virtual index and adding a first physical index to the virtual index, wherein the first physical index includes a first plurality of shards;

receiving a request to index a document;

in response to the request, determining whether the first physical index has reached a capacity threshold;

in response to determining that the first physical index has reached the capacity threshold, automatically creating and adding a second physical index to the virtual index, wherein the second physical index includes a second plurality of shards; and adding the document into the second physical index.

9. The non-transitory machine-readable medium of claim 8, wherein the operations further comprise:

(i) creating a compaction log;

(ii) determining a smallest physical index and a current physical index included in the virtual index;

(iii) moving one or more documents from the smallest physical index to the current physical index, wherein a record for each document move is added to the compaction log;

(iv) determining whether the move is successful; and (v) in response to determining that the move is successful, removing the smallest physical index and the compaction log from the virtual index.

10. The non-transitory machine-readable medium of claim 9, wherein the operations further comprise:

in response to determining that the move is unsuccessful, rolling back the current physical index to a previous physical index based on the compaction log.

11. The non-transitory machine-readable medium of claim 9, wherein the operations further comprise:

repeating steps (i)-(v) until a target number of physical indices are obtained.

12. The non-transitory machine-readable medium of claim 9, wherein the smallest physical index is the first physical index, and the current physical index is the second physical index.

13. The non-transitory machine-readable medium of claim 8, wherein the first plurality of shards and the second plurality of shards are computed in accordance with a shard number function.

14. The non-transitory machine-readable medium of claim 13, wherein the shard number function is: $s=m*k^{n-1}$, wherein s is a number of shards, m is an initial number of shards, k is an increasing factor, and n is a sequence number of a physical index.

15. A data processing system, comprising:

a processor; and a memory coupled to the processor to store instructions, which when executed by the processor, cause the processor to perform operations, the operations including creating a virtual index and adding a first physical index to the virtual index, wherein the first physical index includes a first plurality of shards;

receiving a request to index a document;

in response to the request, determining whether the first physical index has reached a capacity threshold;

in response to determining that the first physical index has reached the capacity threshold, automatically creating and adding a second physical index to the virtual index, wherein the second physical index includes a second plurality of shards; and adding the document into the second physical index.

16. The data processing system of claim 15, wherein the operations further include (i) creating a compaction log;

(ii) determining a smallest physical index and a current physical index included in the virtual index;

(iii) moving one or more documents from the smallest physical index to the current physical index, wherein a record for each document move is added to the compaction log;

(iv) determining whether the move is successful; and (v) in response to determining that the move is successful, removing the smallest physical index and the compaction log from the virtual index.

17. The data processing system of claim 16, wherein the operations further include in response to determining that the move is unsuccessful, rolling back the current physical index to a previous physical index based on the compaction log.

18. The data processing system of claim 16, wherein the operations further include repeating steps (i)-(v) until a target number of physical indices are obtained.

19. The data processing system of claim 16, wherein the smallest physical index is the first physical index, and the current physical index is the second physical index.

20. The data processing system of claim 15, wherein the first plurality of shards and the second plurality of shards are computed in accordance with a shard number function.

21. The data processing system of claim 20, wherein the shard number function is: $s=m*k^{n-1}$, wherein s is a number of shards, m is an initial number of shards, k is an increasing factor, and n is a sequence number of a physical index.

* * * * *